United States Patent
Kuramitsu et al.

(10) Patent No.: US 11,370,477 B2
(45) Date of Patent: Jun. 28, 2022

(54) ELECTRIC POWER STEERING DEVICE

(71) Applicants: DENSO CORPORATION, Kariya (JP); Nagoya Institute of Technology, Nagoya (JP)

(72) Inventors: Shuji Kuramitsu, Kariya (JP); Hiroyasu Otake, Kariya (JP); Ryo Kano, Kariya (JP); Yoshifumi Morita, Nagoya (JP); Hironao Watanabe, Nagoya (JP); Takayuki Kato, Nagoya (JP)

(73) Assignees: DENSO CORPORATION, Kariya (JP); NAGOYA INSTITUTE OF TECHNOLOGY, Nagoya (JP)

( * ) Notice: Subject to any disclaimer, the term of this patent is extended or adjusted under 35 U.S.C. 154(b) by 185 days.

(21) Appl. No.: 16/701,592

(22) Filed: Dec. 3, 2019

(65) Prior Publication Data
US 2020/0180684 A1 Jun. 11, 2020

(30) Foreign Application Priority Data
Dec. 5, 2018 (JP) .............................. JP2018-228086

(51) Int. Cl.
*B62D 5/04* (2006.01)
*B62D 6/00* (2006.01)

(52) U.S. Cl.
CPC ......... *B62D 5/0472* (2013.01); *B62D 5/0463* (2013.01); *B62D 6/008* (2013.01)

(58) Field of Classification Search
CPC .................................................... B62D 6/008
USPC ........................................................ 701/41
See application file for complete search history.

(56) References Cited

U.S. PATENT DOCUMENTS

| 10,933,905 | B2 * | 3/2021 | Shah ................... | B62D 5/0457 |
| 2009/0112406 | A1 * | 4/2009 | Fujii ................... | B62D 5/0463 701/42 |
| 2010/0042295 | A1 | 2/2010 | Shibta et al. | |
| 2010/0228441 | A1 | 9/2010 | Watanabe et al. | |
| 2013/0060427 | A1 | 3/2013 | Kataoka et al. | |
| 2014/0303848 | A1 * | 10/2014 | Bean ................... | B62D 5/0463 701/41 |
| 2015/0149038 | A1 * | 5/2015 | Krueger ............... | B62D 6/008 701/41 |

(Continued)

FOREIGN PATENT DOCUMENTS

| JP | 2004-82798 A | 3/2004 | |
| JP | 2008114749 B2 * | 5/2008 | ............... B62D 6/00 |

(Continued)

*Primary Examiner* — Jeff A Burke
*Assistant Examiner* — Jerrod Irvin Davis
(74) *Attorney, Agent, or Firm* — Maschoff Brennan

(57) ABSTRACT

A calculator or an electronic control unit (ECU) calculates an instruction value of a column assist torque and a rack assist torque output from a column actuator, or a column motor, and a rack actuator, or a rack motor, based at least on a torsion torque. The calculator includes a base assist controller, a stabilization controller, and an adder. The base assist controller individually or commonly calculates a base assist torque based on the torsion torque. The stabilization controller individually or commonly calculates a stabilization torque for stabilizing a steering system. The adder performs addition of the base assist torque and the stabilization torque.

6 Claims, 15 Drawing Sheets

(56) References Cited

U.S. PATENT DOCUMENTS

| | | | |
|---|---|---|---|
| 2015/0259007 A1* | 9/2015 | Di Cairano | B62D 15/025 |
| | | | 701/41 |
| 2017/0240205 A1* | 8/2017 | Nakada | B62D 6/003 |
| 2018/0086371 A1* | 3/2018 | Wang | B62D 5/0481 |
| 2018/0281846 A1* | 10/2018 | Schreiner | B62D 5/0484 |
| 2019/0176876 A1* | 6/2019 | Hwa | B62D 5/0457 |
| 2019/0308659 A1* | 10/2019 | Pramod | B62D 15/025 |
| 2019/0383707 A1* | 12/2019 | Yu | B62D 5/0457 |
| 2020/0039583 A1* | 2/2020 | Fazekas | B62D 5/0463 |
| 2020/0070872 A1* | 3/2020 | Ushiro | B62D 5/04 |

FOREIGN PATENT DOCUMENTS

| | | |
|---|---|---|
| JP | 5168882 B2 | 3/2013 |
| JP | 5533822 B2 | 6/2014 |

\* cited by examiner

CLOSED LOOP CHARACTERISTICS FROM STEERING TORQUE TO TORSION TORQUE

FREQUENCY CHARACTERISTICS OF STABILIZATION CONTROLLER

— COLUMN RES CHARA
---- RACK RES CHARA ($k_{IM}$ = REF VAL)
—·— RACK RES CHARA ($k_{IM}$ = 5 TIMES)
—··— RACK RES CHARA ($k_{IM}$ = 10 TIMES)

FREQUENCY CHARACTERISTICS OF RESPONSE COMPENSATOR

ELECTRIC POWER STEERING DEVICE

CROSS REFERENCE TO RELATED APPLICATION

The present application is based on and claims the benefit of priority of Japanese Patent Application No. 2018-228086, filed on Dec. 5, 2018, the disclosure of which is incorporated herein by reference.

TECHNICAL FIELD

The present disclosure generally relates to an electric power steering device.

BACKGROUND INFORMATION

In the related art, it is known that an electric power steering device for assisting a drivers steering operation uses a plurality of actuators that generate a steering assist torque.

For example, electric power steering devices may include one of two electric motors disposed on a column, where the other is disposed on a rack. In this case, high output can be achieved by distributing the load among the two electric motors, and as such, the steering performance, or operability, can be improved by individually controlling each of the electric motors according to a travel state of the vehicle.

In general, a steering system of a vehicle may be destabilized by resonance of a steering wheel due to the elasticity of a torsion bar used in a torque sensor, and the steering system. However, the related art is silent about techniques for stabilizing a steering system.

SUMMARY

It is an object of the present disclosure to provide an electric power steering device that stabilizes a steering system in an electric power steering device including a plurality of actuators.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
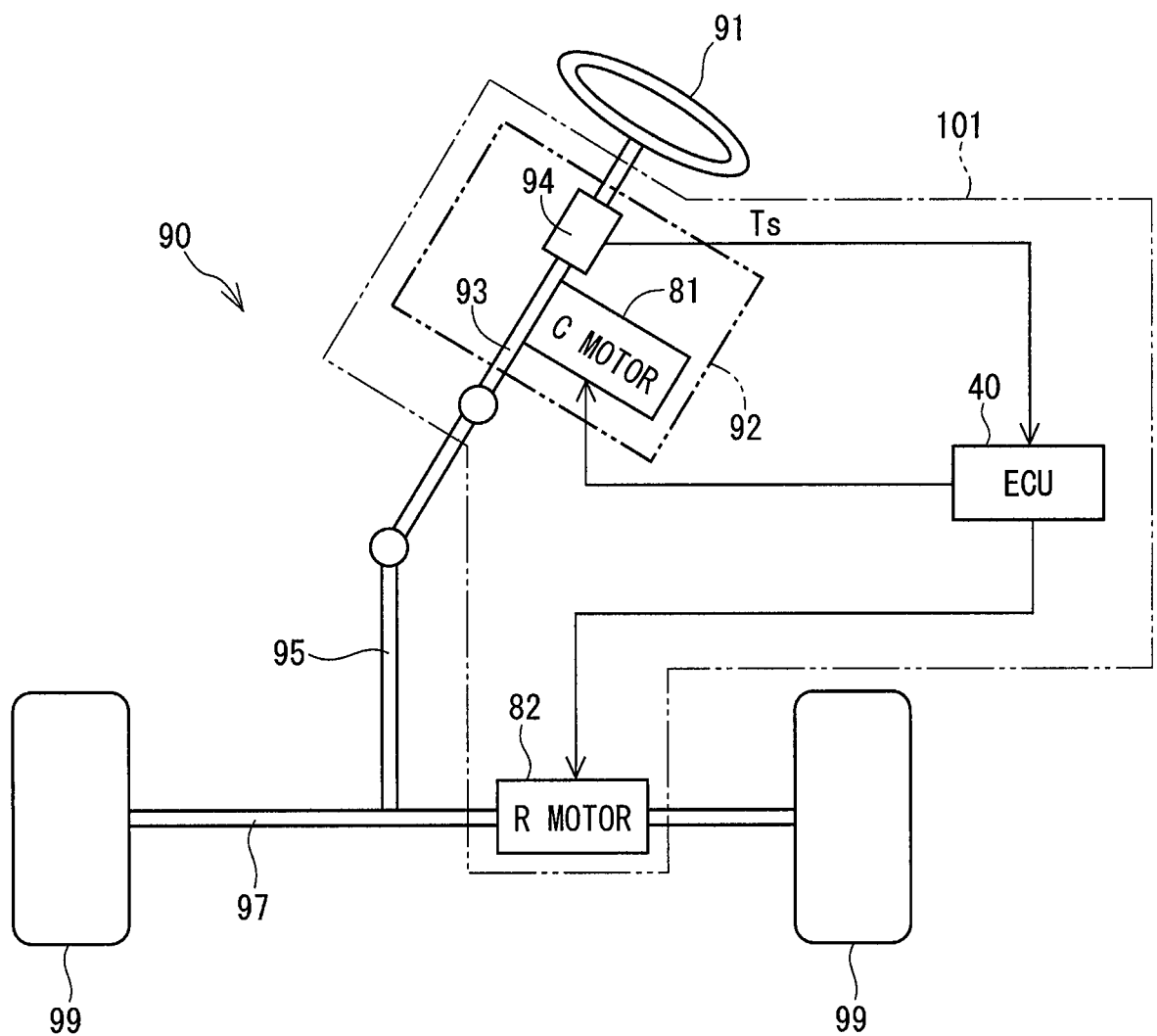
FIG. 1 is a diagram of a configuration of an electric power steering device according to a first embodiment of the present disclosure.

Hereinafter, a plurality of embodiments of the electric power steering device will be described based on the drawings. The electric power steering device of each embodiment is an apparatus for outputting a steering assist torque by a plurality of actuators in a steering system of a vehicle. In the following embodiments, substantially same structural parts are designated with the same reference numerals thereby to simplify the description. The following first to fifth embodiments may collectively be referred to as a present embodiment.

First Embodiment

The first embodiment will be described with reference to FIGS. 1 to 5. FIG. 1 shows a configuration of an electric power steering device 101 applied to a steering system 90. FIG. 1 shows an installation configuration in which one ECU 40 is provided as a "calculator," and an installation configuration in which a plurality of ECUs are provided is shown as a fifth embodiment in FIG. 18, in contrast. On the other hand, the first to fourth embodiments are described below as a plurality of examples in which a control configuration of the ECU is respectively different. The control configuration of the ECU may be applied either to the installation configuration of one ECU 40 shown in FIG. 1 or to the installation configuration of a plurality of ECUs shown in FIG. 18.

As shown in FIG. 1, the steering system 90 includes a steering wheel 91, a steering shaft 93, an intermediate shaft 95, a rack 97 and the like. The steering shaft 93 is accommodated in a column 92, and a steering wheel 91 is connected to one end, and an intermediate shaft 95 is connected to the other end thereof. At the end opposite of the intermediate shaft 95 relative to the steering wheel 91, the rack 97 is provided which converts rotation into reciprocal motion and transmits the motion by a rack and pinion mechanism. When the rack 97 reciprocates, a tire 99 is steered.

In the steering system 90, the electric power steering device 101 generates a steering assist torque by a column motor ("C MOTOR" in the drawing) 81 and a rack motor ("R MOTOR" in the drawing) 82 which are two actuators. In the specification, this driving method of the electric power steering device 101 is referred to as a "twin assist method." The twin assist method is effective for a large torque output. The electric power steering device 101 includes a column motor 81, a rack motor 82, a torque sensor 94, and an ECU, or an electronic control unit, 40 as a "calculator."

A column motor 81 as a "column actuator" is provided on a column side close to the column 92 with respect to the intermediate shaft 95. A rack motor 82 as a "rack actuator" is provided on a rack side close to the rack 97 with respect to the intermediate shaft 95. Hereinafter, a steering assist torque output from the column motor 81 is referred to as a "column assist torque," and the steering assist torque output from the rack motor 82 is referred to as a "rack assist torque."

The column motor 81 and the rack motor 82 are appropriately abbreviated as motors 81 and 82. In the present embodiment, the detailed configuration and driving method of the motors 81 and 82 do not matter. For example, the motors 81 and 82 are constituted by three-phase brushless motors, and an instruction voltage is calculated by a current feedback control. The inverter is driven by a PWM signal generated based on the instruction voltage, and a direct current (DC) voltage of an in-vehicle battery is converted to a three-phase AC voltage and applied to the respective phase windings of the motors 81 and 82. Thereby, the motors 81 and 82 output desired assist torque. Also, for example, the motors 81 and 82 may be configured as a two-system motor redundantly having two sets of three-phase winding.

The torque sensor 94 is provided in a middle part of the steering shaft 93, and detects a torsion torque Ts applied to the steering shaft 93 based on a torsion angle of the torsion bar. In the description of "other embodiments," other configurations of the torque sensor other than the configuration shown in FIG. 1 are described.

The ECU 40 includes a microcomputer, a drive circuit and the like, and includes a CPU, a ROM, an I/O (not shown), and a bus line connecting those components. The ECU 40 performs software processing by executing a program stored in advance by the CPU, and performs control by hardware processing by a dedicated electronic circuit. The ECU 40 of the present embodiment calculates instruction values of the column assist torque and the rack assist torque based at least on the torsion torque Ts detected by the torque sensor 94. Other parameters used for the calculation of the assist torque are described later with reference to FIG. 2.

Further, similar to general motor control, the ECU 40 obtains a phase current from a current sensor provided in the inverter or on a current path connecting the inverter and the winding set. Additionally, the ECU 40 obtains a motor angle from a rotation angle sensor provided in each of the column motor 81 and the rack motor 82, and time-differentiates the motor angle to calculate a motor angular speed. The motor angle is also used for a dq coordinate conversion calculation in a vector control.

Since such a point is a general well-known technique, illustration of a rotation angle sensor and the like is omitted from the drawing. Then, the ECU 40 performs current feedback control so that an actual current follows the instruction current calculated based on the instruction value of the assist torque. In addition, in the present embodiment, information of a vehicle speed V detected by a vehicle speed sensor (not shown in FIG. 1) is acquired by the ECU 40.

Subsequently, the control configuration of the ECU of the first embodiment is described with reference to FIG. 2. Regarding the reference numerals of the ECUs, "40" shown in FIG. 1 indicates that the ECU is physically integrated at one place. On the other hand, in the first to fourth embodiments, in order to distinguish the ECUs having different internal configurations, the ECUs of the respective embodiments are assigned with reference numerals "41" to "44." Further, in the second embodiment, in addition to the ECU 42 of the base configuration, the ECUs of the first to fifth modifications are assigned with reference numerals "421 to 425."

In particular, the ECU has a base assist controller, a stabilization controller, and an adder, according to the first and second embodiments and its modifications. The base assist controller may calculate individually a "base assist torque" as a main component of the column assist torque and as a main component of the rack assist torque based on the torsion torque, or may calculate the (i.e., single) "base assist torque" commonly for the two torques. The stabilization controller individually calculates a "stabilization torque" which stabilizes the steering system as other (i.e., sub) component of the column assist torque and the rack assist torque (i.e., of the two torques), or may calculate the (i.e., single) "stabilization torque" commonly for the two torques. The adder adds the base assist torque and the stabilization torque.

Figure 2:
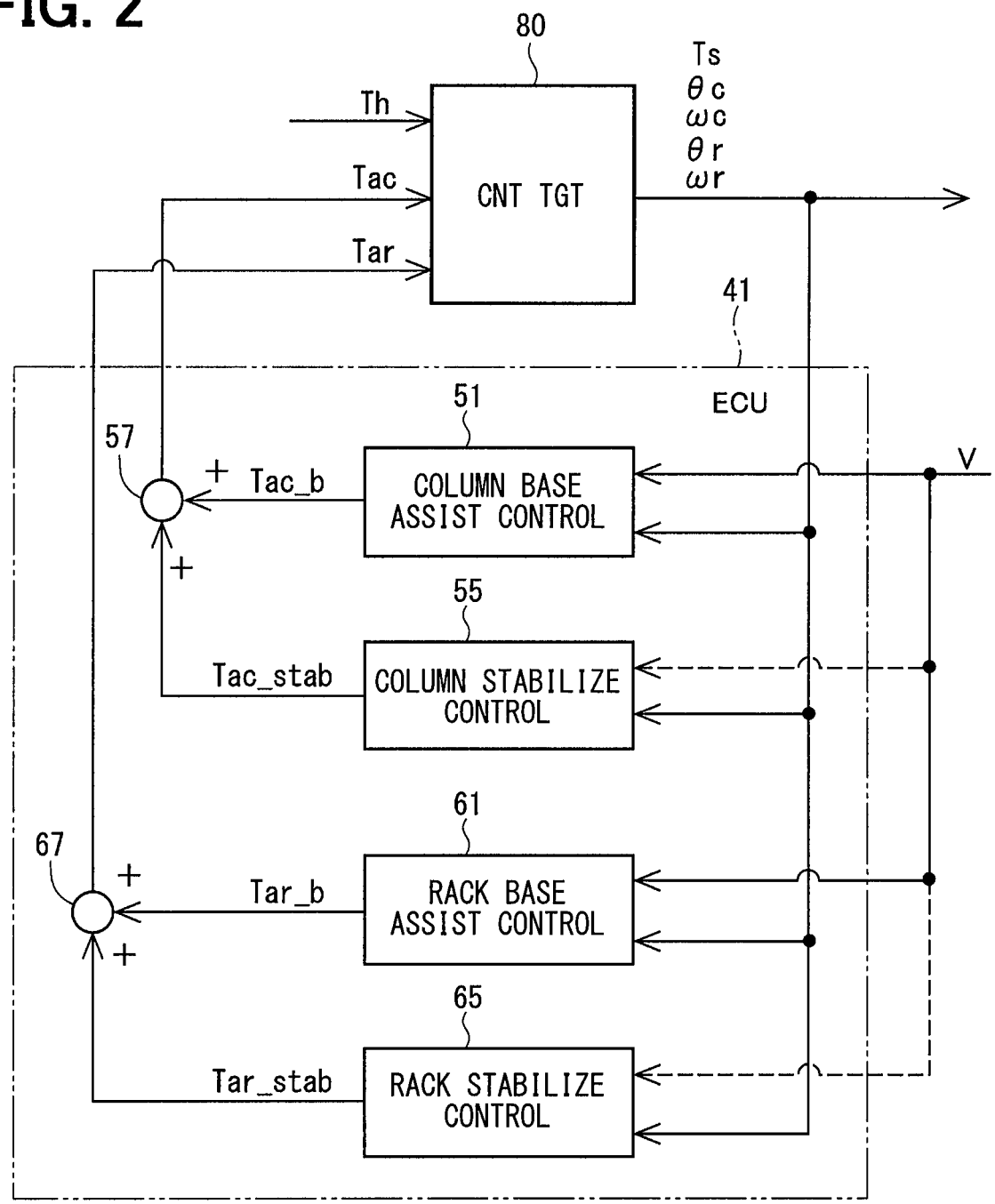
FIG. 2 is a control block diagram of an electronic control unit (ECU) according to the first embodiment of the present disclosure.

In the ECU 41 of the first embodiment shown in FIG. 2, the base assist controller and the stabilization controller individually, i.e., separately, calculate the "base assist torque" and the "stabilization torque." Specifically, the ECU 41 includes a column base assist controller 51, a column stabilization controller 55, a rack base assist controller 61, a rack stabilization controller 65, and adders 57 and 67.

Further, in the control block diagram of the ECU in FIG. 2 and thereafter, a "control target 80" includes an entire steering system from the steering wheel 91 to the tire 99 shown in FIG. 1 including the column motor 81 and the rack motor 82. A steering torque Th, a column assist torque Tac and a rack assist torque Tar are input to the control target 80. The torsion torque Ts output from the control target 80 is acquired by each of the controllers 51, 55, 61, 65.

Basically, a column motor angle $\theta c$ and a column motor angular speed $\omega c$ are acquired by the column base assist controller 51 and the column stabilization controller 55, and a rack motor angle $\theta r$ and a rack motor angular speed $\omega r$ are acquired by the rack base assist controller 61 and the rack stabilization controller 65. However, the column motor angle $\theta c$ and the column motor angular speed $\omega c$ may be acquired by the rack base assist controller 61 and the rack stabilization controller 65, and conversely, the rack motor angle $\theta r$ and the rack motor angular speed $\omega r$ may be acquired by the column base assist controller 51 and the column stabilization controller 55.

Further, the vehicle speed V is input to the column base assist controller 51 and the rack base assist controller 61. As indicated by a broken line, the vehicle speed V may be or may be not input to the column stabilization controller 55 and the rack stabilization controller 65. That is, the stabilization controllers 55 and 65 may use information on the vehicle speed V for control or not. The same applies to the following embodiments.

In the following description, the calculation and control related to the column assist torque Tac of the column motor 81 are referred to as a "column side" calculation and control. Further, the calculation and control relating to the rack assist torque Tar of the rack motor 82 are referred to simply as a "rack side" calculation and control. First, on the column side, the column base assist controller 51 calculates a column base assist torque Tac_b based on information such as the torsion torque Ts. The column stabilization controller 55 calculates a column stabilization torque Tac_stab based on the information such as the torsion torque Ts. The adder 57 outputs the column assist torque Tac obtained by adding the column base assist torque Tac_b and the column stabilization torque Tac_stab to the control target 80.

Similarly, on the rack side, the rack base assist controller 61 calculates a rack base assist torque Tar_b based on information such as the torsion torque Ts. The rack stabilization controller 65 calculates a rack stabilization torque Tar_stab based on the information such as the torsion torque Ts. The adder 67 outputs the rack assist torque Tar obtained by adding the rack base assist torque Tar_b and the rack stabilization torque Tar_stab to the control target 80.

Here, the stabilization control by the stabilization controllers 55 and 65 is described with reference to the frequency characteristics diagrams of FIGS. 3 to 5. In the frequency characteristics shown in FIG. 3 and the subsequent drawings, the horizontal axis represents a logarithmic scale frequency [unit: Hz] and the vertical axis represents a gain [unit: dB] or a phase [unit: deg], as in the general case. However, numerical values other than "0" on the vertical axis are not shown. Further, "fo" on the horizontal axis is a reference frequency for comparison with other drawing, and the reference frequency fo in each drawing is the same value.

Figure 3:
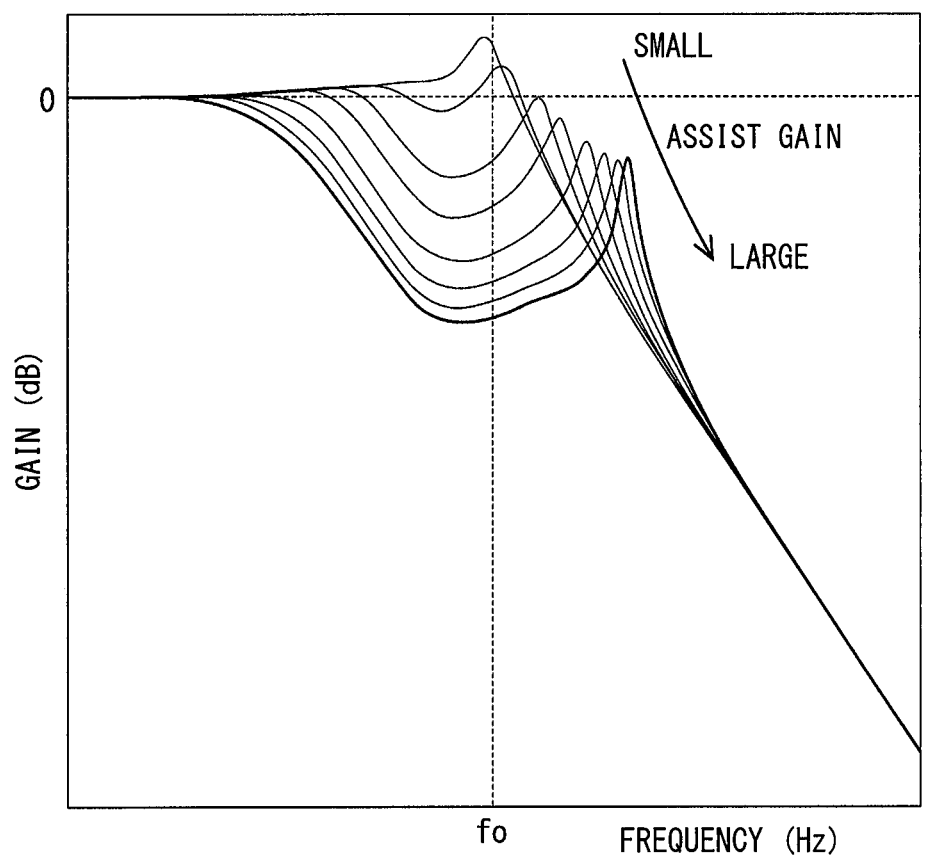
FIG. 3 is a frequency characteristics diagram regarding a resonance of a steering wheel.

FIG. 3 shows a closed loop characteristics from the steering torque Th to the torsion torque Ts. In general, in the steering system of a vehicle, resonance occurs due to the elasticity of the torsion bar used in the torque sensor 94, and the gain rapidly increases at the proximity of a resonance frequency. When resonance occurs, the steering wheel 91 may automatically resonate to make steering unstable. Also, the greater the assist gain is, the resonance frequency moves to a higher frequency side. In order to assist the steering torque with the electric power steering device, stabilization control is required to suppress the resonance and stabilize the steering system.

Figure 4:
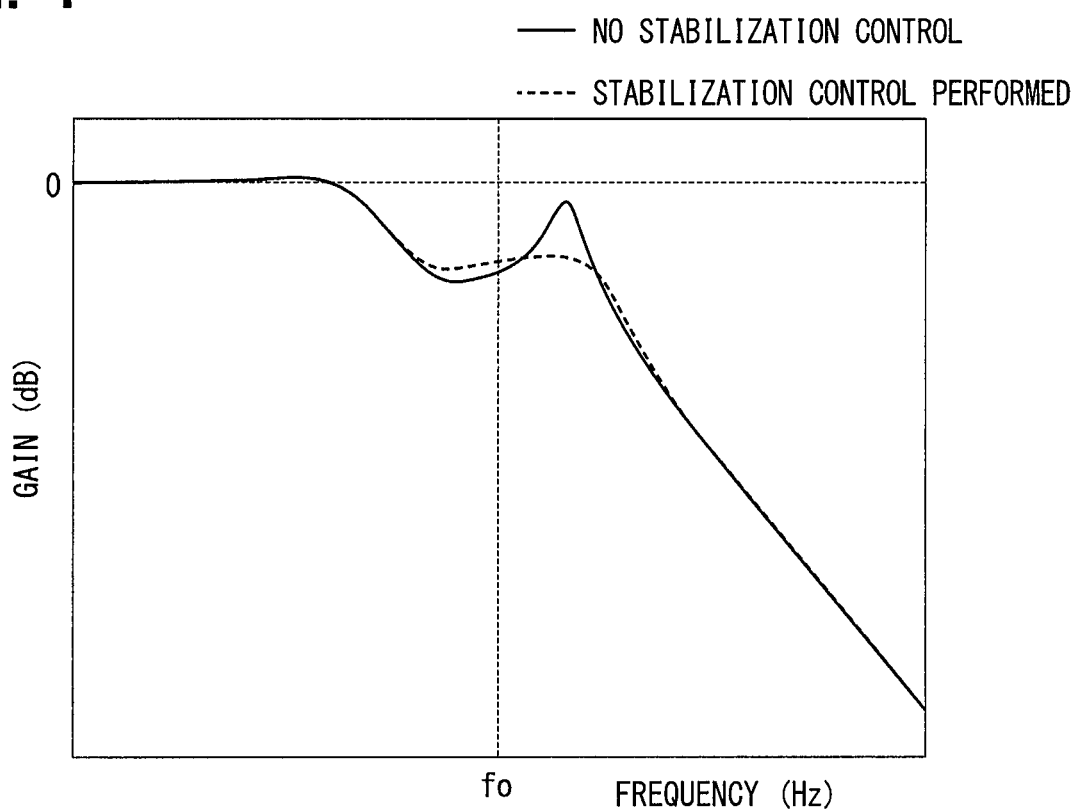
FIG. 4 is a frequency characteristics diagram regarding a suppression of resonance by a stabilization controller.
Figure 5:
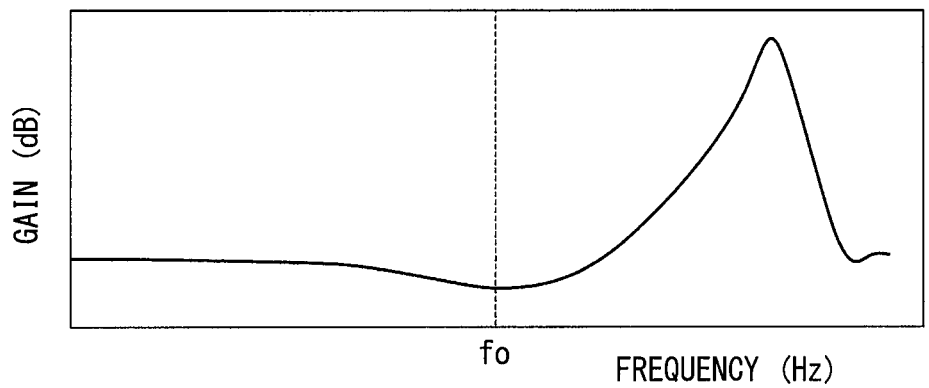
FIG. 5 is a frequency characteristics diagram of the stabilization controller.

As shown in FIG. 4, a peak of the resonance is mitigated in the frequency characteristic of "stabilization control performed," i.e., the resonance is suppressed by the stabilization control. An example of the gain (or amplitude) characteristics of the stabilization controller is shown in FIG. 5 for reference. The motor instruction current is calculated from a total torque of (i) the stabilization torques Tac_stab and Tar_stab calculated by the stabilization controllers 55 and 65 based on the torsion torque Ts detected by the torque sensor 94 and (ii) the base assist torques Tac_b and Tar_b. Note that the outputs of the stabilization controllers 55 and 65 may be controlled to change according to the vehicle speed V or the like, in some cases.

Effects

In the ECU 41 and the like of the present embodiment, values obtained by adding the stabilization torque Tac_stab and Tar_stab to the base assist torque Tac_b and Tar_b are output to the column motor 81 and the rack motor 82 as the assist torques Tac and Tar. Therefore, in the twin assist type electric power steering device 101 including the two motors 81 and 82, the resonance of the steering wheel 91 can be suppressed, and the steering system can be stabilized.

In the ECU 41 of the first embodiment, the column base assist torque Tac_b and the rack base assist torque Tar_b are calculated individually, and the column stabilization torque Tac_stab and the rack stabilization torque Tar_stab are calculated individually. Since the column side calculation and the rack side calculation are performed independently, even if an abnormality occurs in one controller, such an abnormality in one calculation is prevented from affecting the other calculation.

Second Embodiment

Next, a base control configuration of the second embodiment is described with reference to FIGS. 6 to 10. In the first embodiment, both column-side and rack-side controllers 51, 55, 61, 65 need to be configured for individually performing column-side control and rack-side control regarding both of the base assist torque and the stabilization torque. Therefore, in the second embodiment, regarding at least one of (i) the base assist torque which is the main component of the assist torque and (ii) the stabilization torque which is the other component of the assist torque, a common control of the column side and the rack side is devised.

Figure 6:
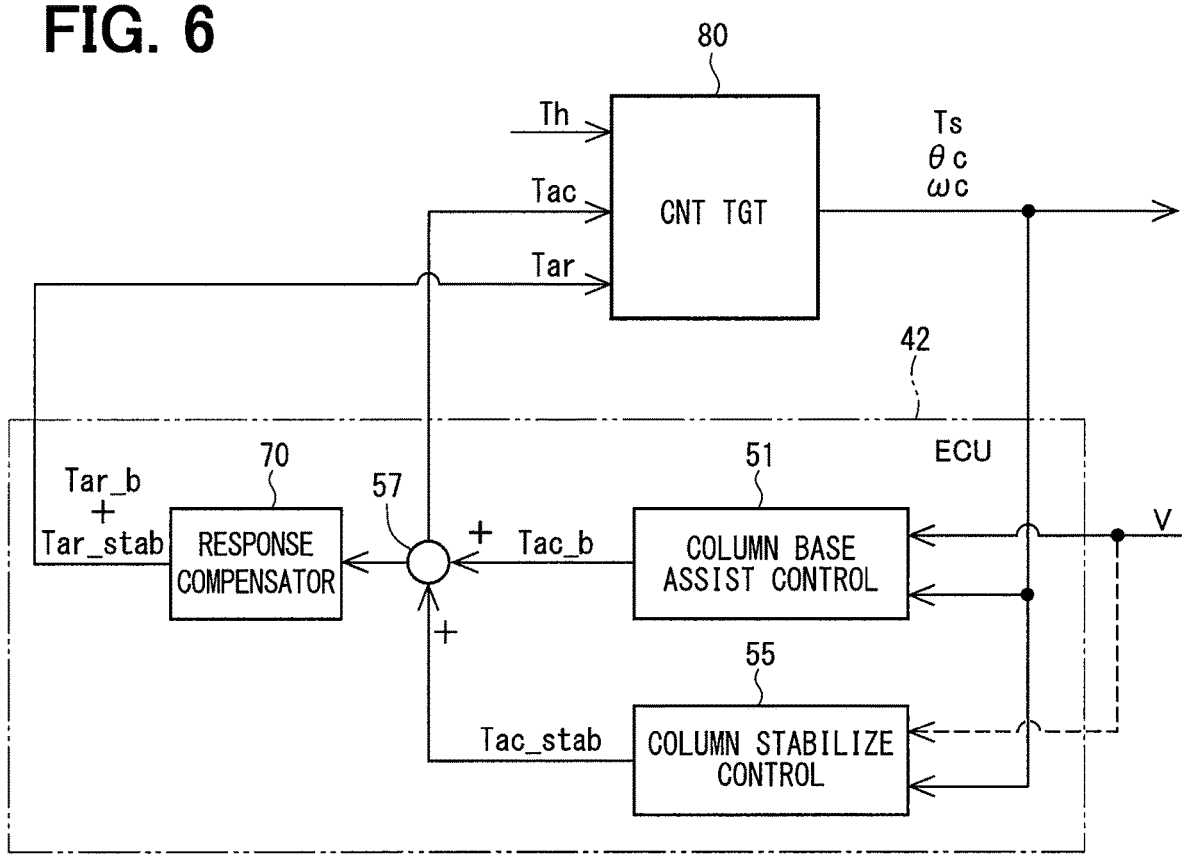
FIG. 6 is a control block diagram of an ECU in a base configuration according to a second embodiment of the present disclosure.

As shown in FIG. 6, the ECU 42 of the second embodiment does not have the rack base assist controller 61 and the rack stabilization controller 65 shown in the ECU 41 of FIG. 1 in the first embodiment, but has a response compensator 70, instead. The response compensator 70 compensates for a difference of the gain and the phase of the rack response characteristics with respect to the column response characteristics in a preset frequency range. The "column response characteristics" are response characteristics of the torsion torque Ts in response to the change of the column assist torque Tac, and the "rack response characteristics" are response characteristic of the torsion torque Ts in response to the change of the rack assist torque Tar.

In the ECU 42 of the second embodiment, a value obtained by processing a sum of the column base assist torque Tac_b and the column stabilization torque Tc_stab by the response compensator 70 is output as the sum of the rack base assist torque Tar_b and the rack stabilization torque Tar_stab. Analytically, a value obtained by processing the column base assist torque Tac_b which is a main component of the column assist torque Tac by the response compensator 70 is output as the rack base assist torque Tar_b which is a main component of the rack assist torque Tar. In addition, a value obtained by processing the column stabilization torque Tac_stab which is the other component of the column assist torque Tac by the response compensator 70 is output as the rack stabilization torque Tar_stab which is other component of the rack assist torque Tar.

When the base assist torque and the stabilization torque before and after the processing are respectively added, they are represented as shown in FIG. 6. That is, by using the response compensator 70, the ECU 42 according to the second embodiment shares the rack base assist control in common with the column base assist control, and shares the rack stabilization control in common with the column stabilization control.

The technical meaning of the response compensator 70 is described with reference to FIGS. 7 to 10. The intermediate shaft 95 is present between the column motor 81 and the rack motor 82. That is, there is no intermediate shaft 95 in the transmission path of a torque from the column motor 81 to the torque sensor 94, and there is an intermediate shaft 95 in the transmission path (of a torque) from the rack motor 82 to the torque sensor 94. Due to the difference in physical structure such as the presence or absence of the intermediate shaft 95, a difference is caused in the response characteristics. More specifically, the response characteristics of the torsion torque Ts are different among the two changes, i.e., in response to (i) the change of the assist torque Tac instructed to the column motor 81 and to (ii) the change of the assist torque Tar instructed to the rack motor 82.

Figure 7:
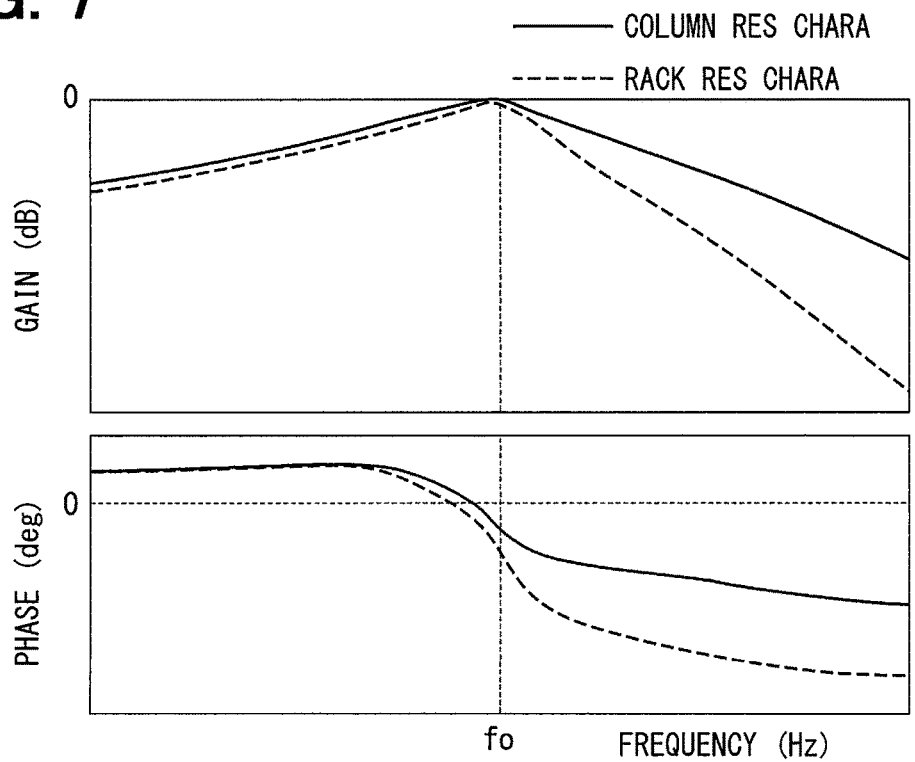
FIG. 7 is a frequency characteristics diagram including column response characteristics and rack response characteristics.
Figure 8:
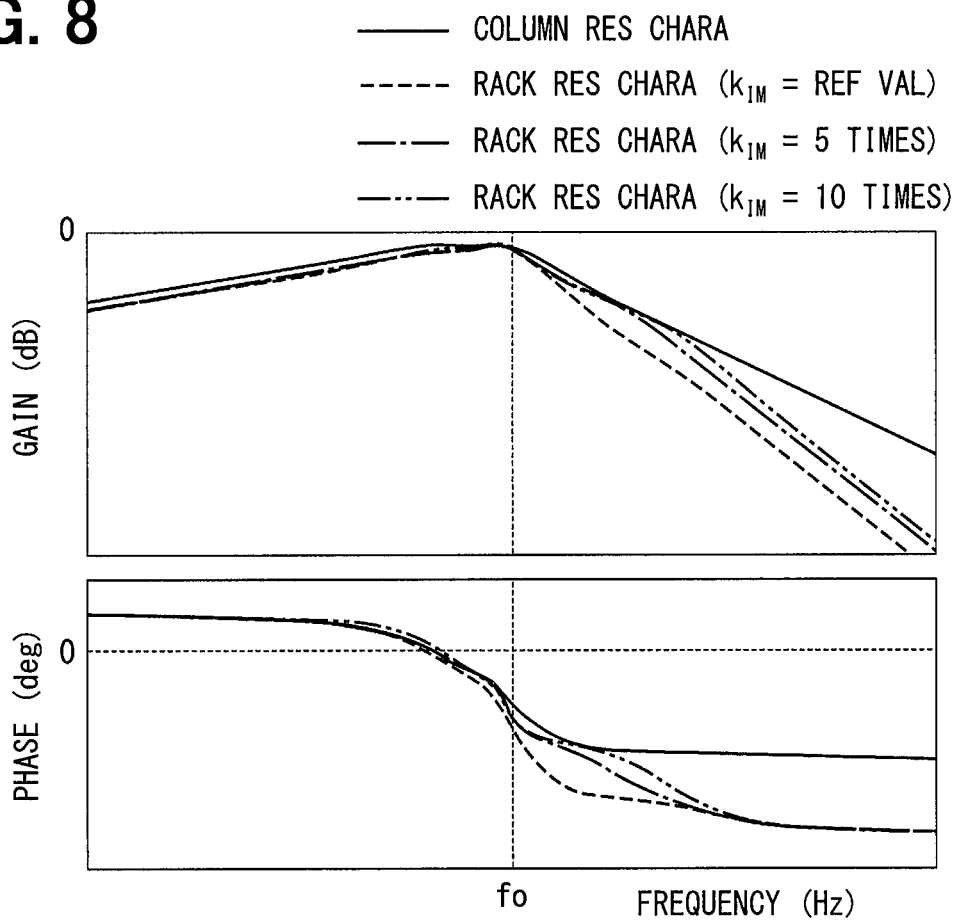
FIG. 8 is a frequency characteristics diagram of (i) the column response characteristics and (ii) the rack response characteristics when rigidity of an intermediate shaft is changed.

As shown in FIG. 7, the gain of the rack response characteristics falls to be lower than the gain of the column response characteristics in a frequency range higher than the reference frequency fo, and the phase of the rack response characteristics lags from the phase of the column response characteristics. FIG. 8 shows the rack response characteristics when a rigidity $k_{IM}$ of the intermediate shaft 95 is changed, i.e., is increased by 5 times and 10 times of the reference value. Increasing the rigidity $k_{IM}$ of the intermediate shaft 95 means that the intermediate shaft 95 approaches a rigid body. Therefore, the difference among the rack response characteristics and the column response characteristics decreases as the rigidity $k_{IM}$ increases.

Figure 9:
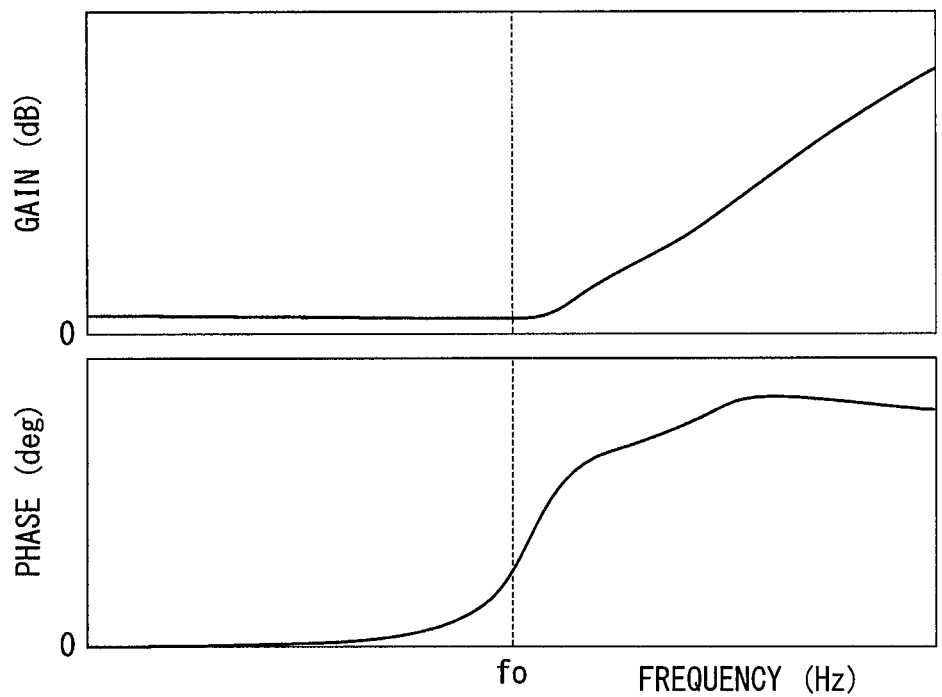
FIG. 9 is a frequency characteristics diagram of a response compensator.

FIG. 9 shows a design example of the frequency characteristic of the response compensator 70. The response compensator 70 compensates for the difference between the rack response characteristics and the column response characteristics by (i) increasing the gain and (ii) advancing the phase in a frequency range higher than the reference frequency fo.

Figure 10:
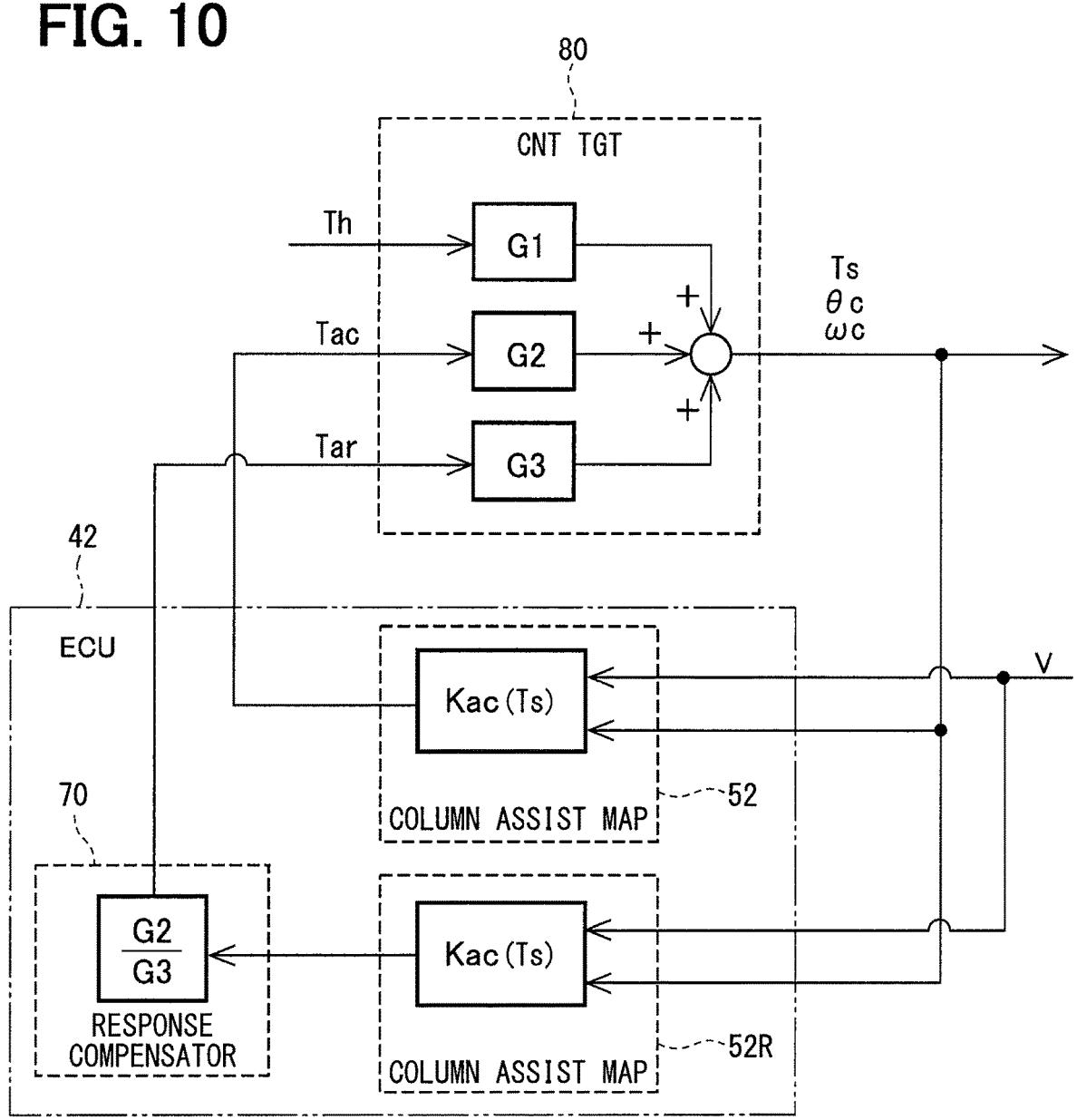
FIG. 10 is a block diagram illustrating a mathematical basis of the response compensator.

FIG. 10 is a block diagram for explaining the mathematical basis/of the response compensator 70. Transmission characteristics from the steering torque Th to a control output are represented as G1, transmission characteristics from the column assist torque Tac to the control output are represented as G2, and transmission characteristics from the rack assist torque Tar to the control output without the response compensator 70 are represented as G3. In the control target 80, the transmission characteristics G1, G2, and G3 are added.

Two column assist maps 52, 52R provided in the ECU 42 are substantially the same. An assist map used in the calculation of the column assist torque Tac has a numeral "52," and an assist map used in the calculation of the rack assist torque Tar has a numeral "52R" for the distinction therebetween. The column assist maps 52, 52R respectively calculate a column assist gain Kac based on the torsion torque Ts.

A value obtained by multiplying the torsion torque Ts by the assist gain Kac that is calculated by the column assist map 52 is output as the column assist torque Tac. A value obtained by multiplying the torsion torque Ts by the assist gain Kac that is calculated by the column assist map 52R is input to the response compensator 70.

The response compensator 70 is implemented at a position between the column assist map 52R and the control target 80, and its transmission characteristics are represented as (G2/G3). Then, a round-trip transmission characteristics from the rack assist torque Tar to the control output after implementing the response compensator 70 are set as "G3× (G2/G3)=G2," which matches with the transmission characteristics G2 from the column assist torque Tac to the control output. Therefore, the rack response characteristics and the column response characteristics are equally compensated.

As described above, the ECU 42 having the base configuration according to the second embodiment performs a common control as the column side control and the rack side control for both of the base assist torque and the stabilization torque. That is, the ECU 42 makes the base assist control and the stabilization control of the column motor 81 and the rack motor 82 in common with each other. As a result, it is sufficient to design only the column side controllers 51 and 55, making the design of the rack side controllers 61 and 65 unnecessary.

Next, with reference to FIGS. 11 to 15, modification examples of the base configuration are described, in which the implementation position of the response compensator 70 is changed from the base configuration of FIG. 6. In each of the modification examples 1 to 5, the ECUs 421 to 425 have the column base assist controller 51 and the column stabilization controller 55 that calculate the column assist torque Tac. Further, regarding the calculation of the rack assist torque Tar, the ECUs 421 to 425 make at least one of the base assist torque control and the stabilization torque control of the rack side in common with the column side control via, or by using, the response compensator 70.

The column base assist controller for calculating the rack base assist torque Tar_b has a numeral "51R" for a distinction from the column base assist controller 51 for calculating the column base assist torque Tac_b. Further, the column stabilization controller for calculating the rack stabilization torque Tar_stab has a numeral "55R" for a distinction from the column stabilization controller 55 for calculating the column stabilization torque Tac_stab.

Figure 11:
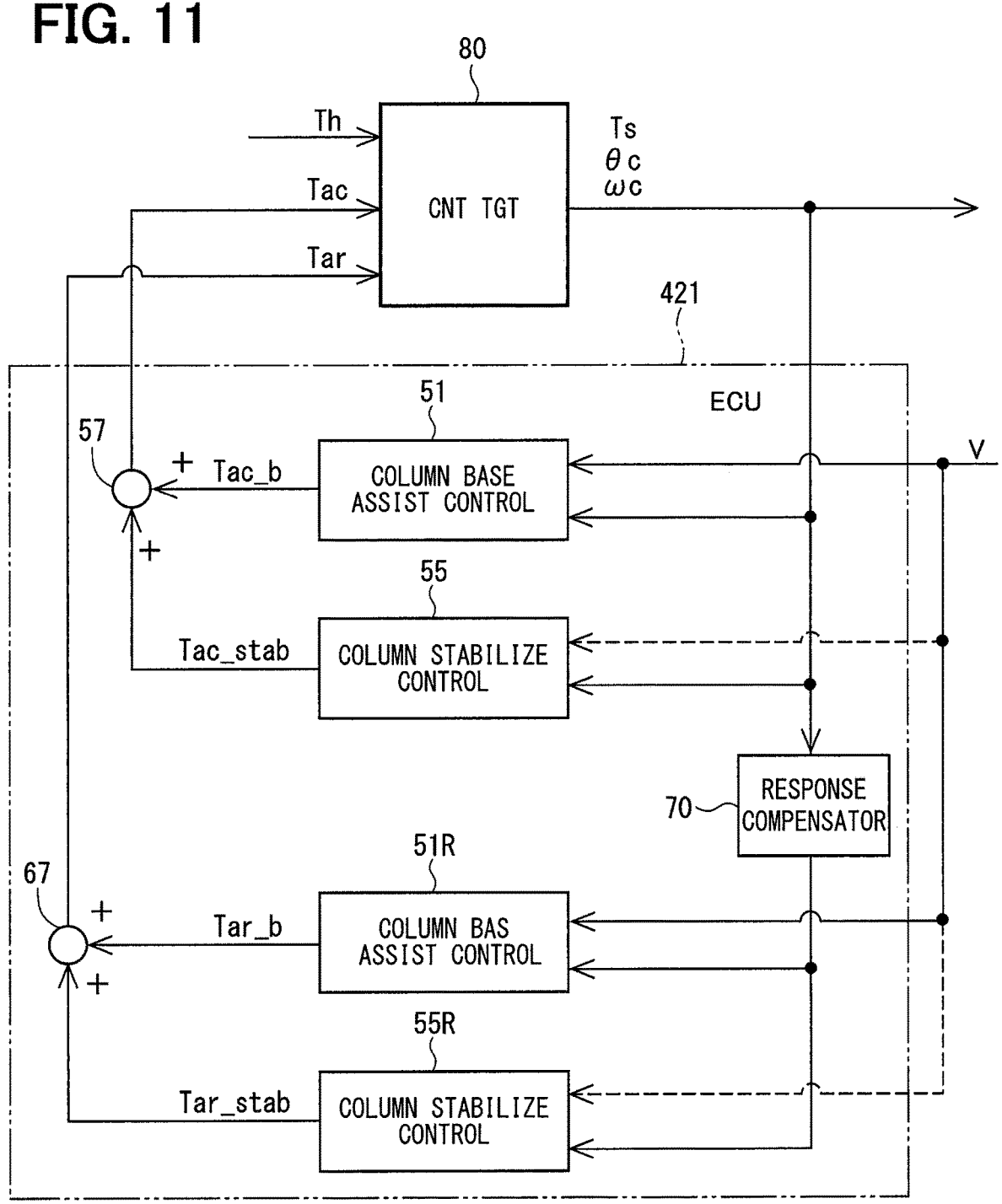
FIG. 11 is a control block diagram of the ECU of a modification example 1 of the second embodiment of the present disclosure.

The ECU 421 of the modification example 1 shown in FIG. 11 has the column base assist controller 51R for the calculation of the rack base assist torque Tar_b and the column stabilization controller 55R for the calculation of the rack stabilization torque Tar_stab, and a response compensator 70 is implemented at an input position in common to both of 51R and 55R. The configuration of the first modification makes the base assist control and the stabilization control in common with each other among the column side and the rack side, and is equivalent to the base configuration of FIG. 6. Therefore, the first modification exerts the same effects as the base configuration.

Figure 12:
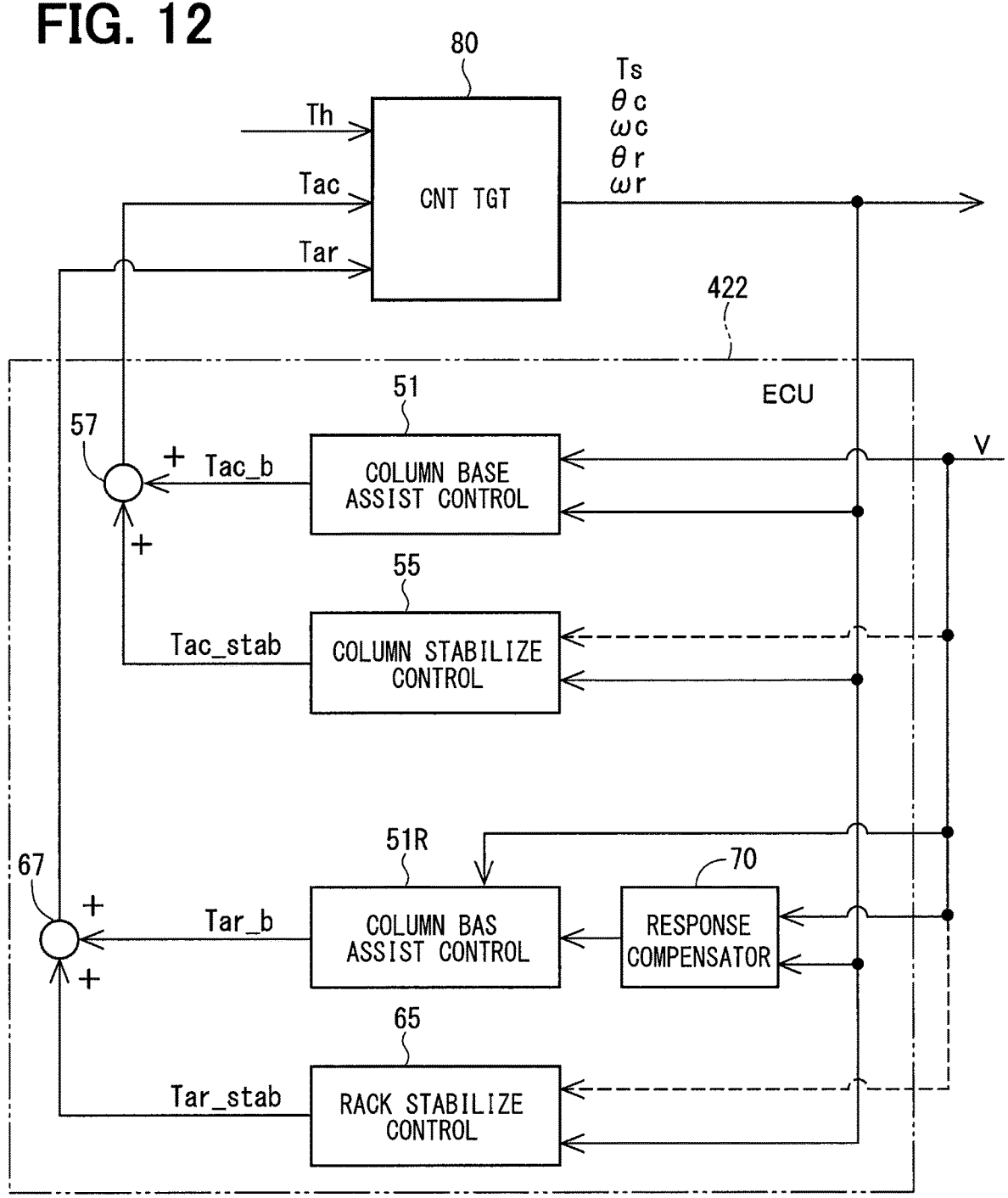
FIG. 12 is a control block diagram of the ECU of a modification example 2 of the second embodiment of the present disclosure.

In the modification example 2 shown in FIG. 12, only the base assist control is made in common among the column side and the rack side, and the stabilization control is performed separately. In general, the control of the base assist torque is provided by a map in which the horizontal axis is the torsion torque and the vertical axis is the assist torque, which greatly affects the steering feel of the driver. Therefore, it takes time for adaptation (i.e., tuning) of the control to a real vehicle.

Therefore, the ECU 422 of the modification example 2 has the column base assist controller 51R for calculating the rack base assist torque Tar_b, and the response compensator 70 is implemented to the input portion thereof. Further, the ECU 422 also has the rack stabilization controller 65 for calculating the rack stabilization torque Tar_stab. In such manner, with regard to the time-consuming adaptation of the base assist control, the calculation load of the ECU 422 can be reduced and the calculation time can be shortened.

Figure 13:
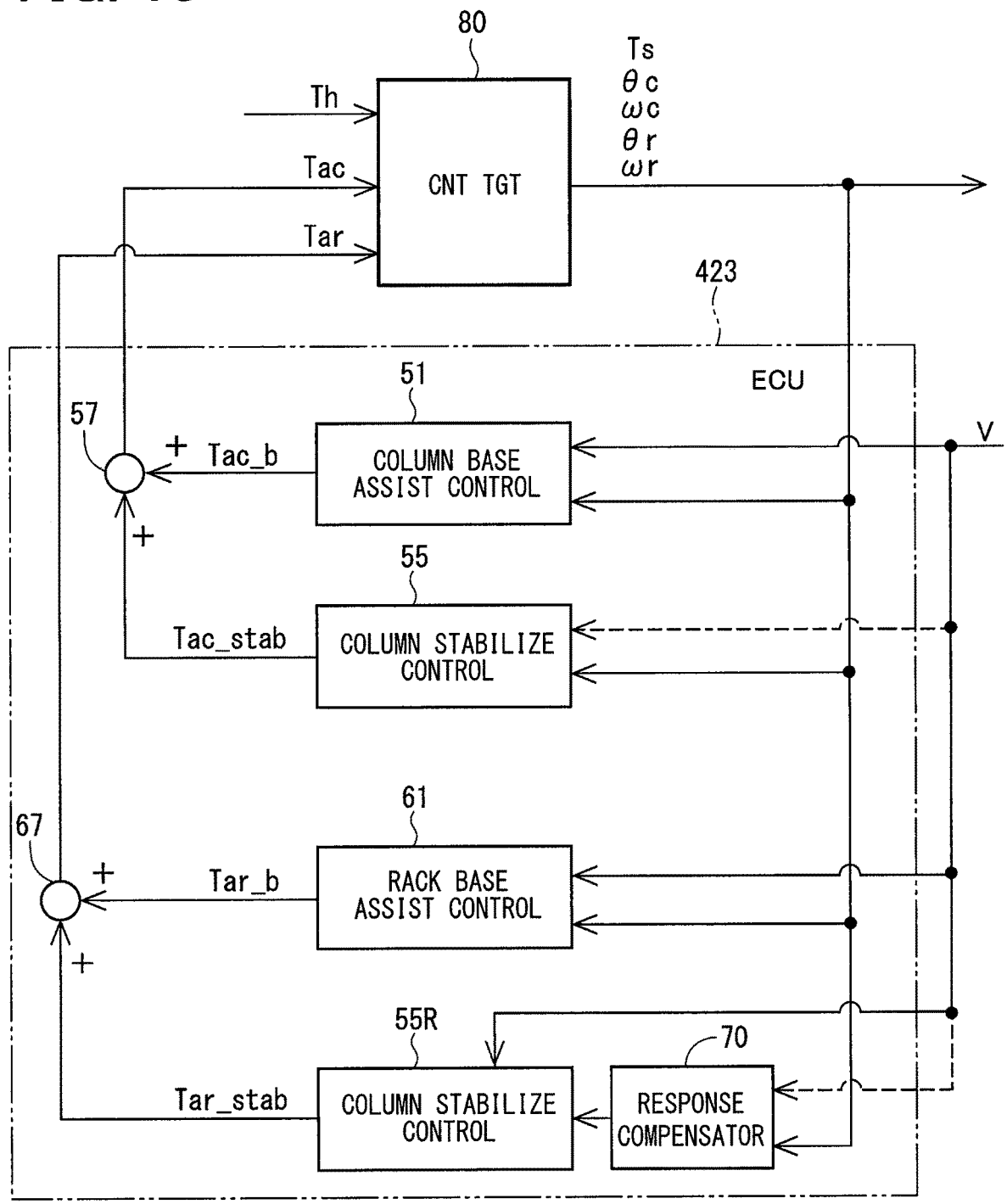
FIG. 13 is a control block diagram of the ECU of a modification example 3 of the second embodiment of the present disclosure.

In the modification example 3 shown in FIG. 13, only the stabilization control is made in common among the column side and the rack side, and the base assist control is performed separately among them. The ECU 423 has the column stabilization controller 55R for calculating the rack stabilization torque Tar_stab, and the response compensator 70 is implemented at the input portion thereof. Further, the ECU 423 has a rack base assist controller 61 that calculates the rack base assist torque Tar_b. In the configuration of the modification example 3, although adaptation to a real vehicle takes time, the adjustment range of the steering feel can be expanded, and the steering feel is improved.

Figure 14:
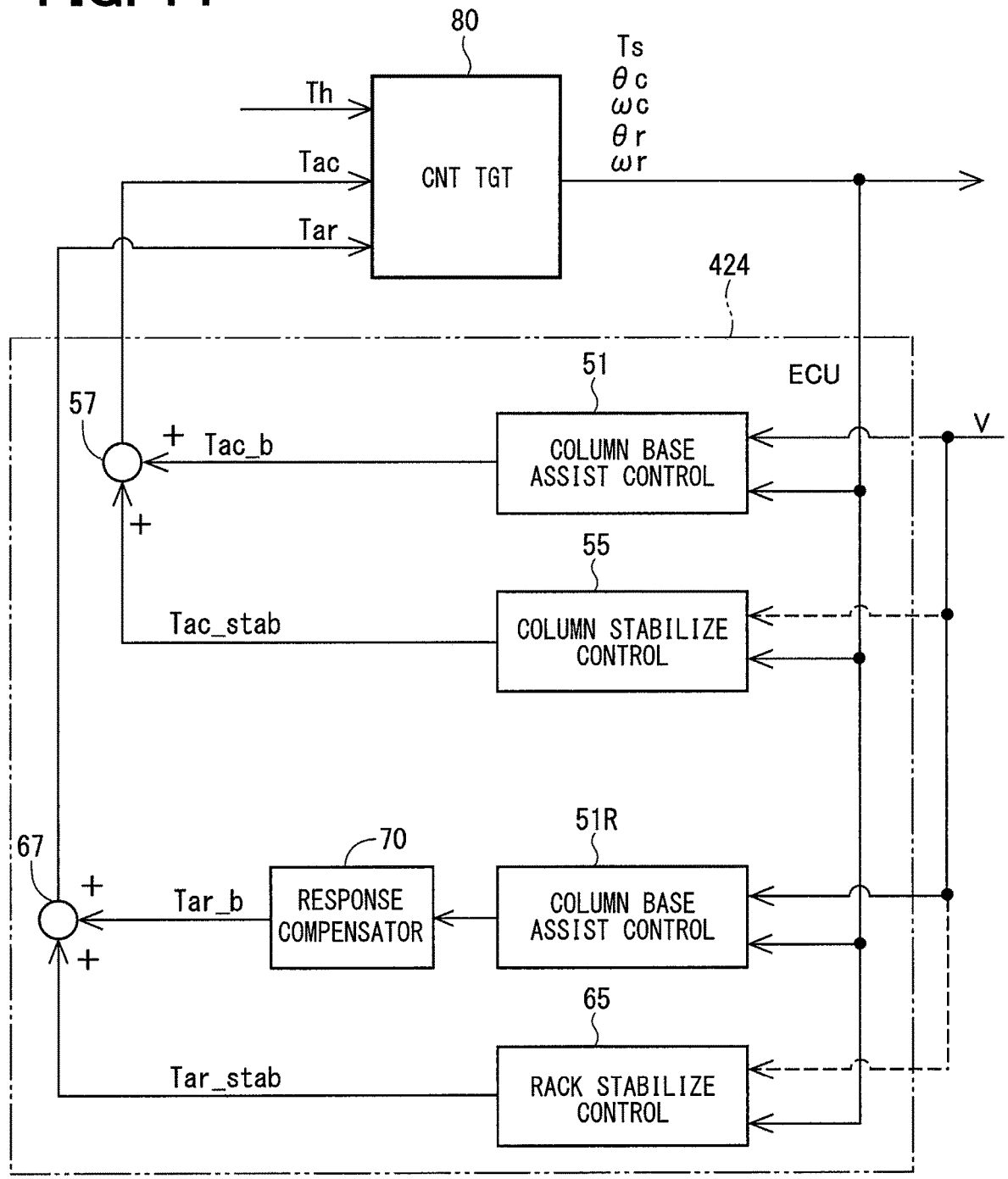
FIG. 14 is a control block diagram of the ECU of a modification example 4 of the second embodiment of the present disclosure.
Figure 15:
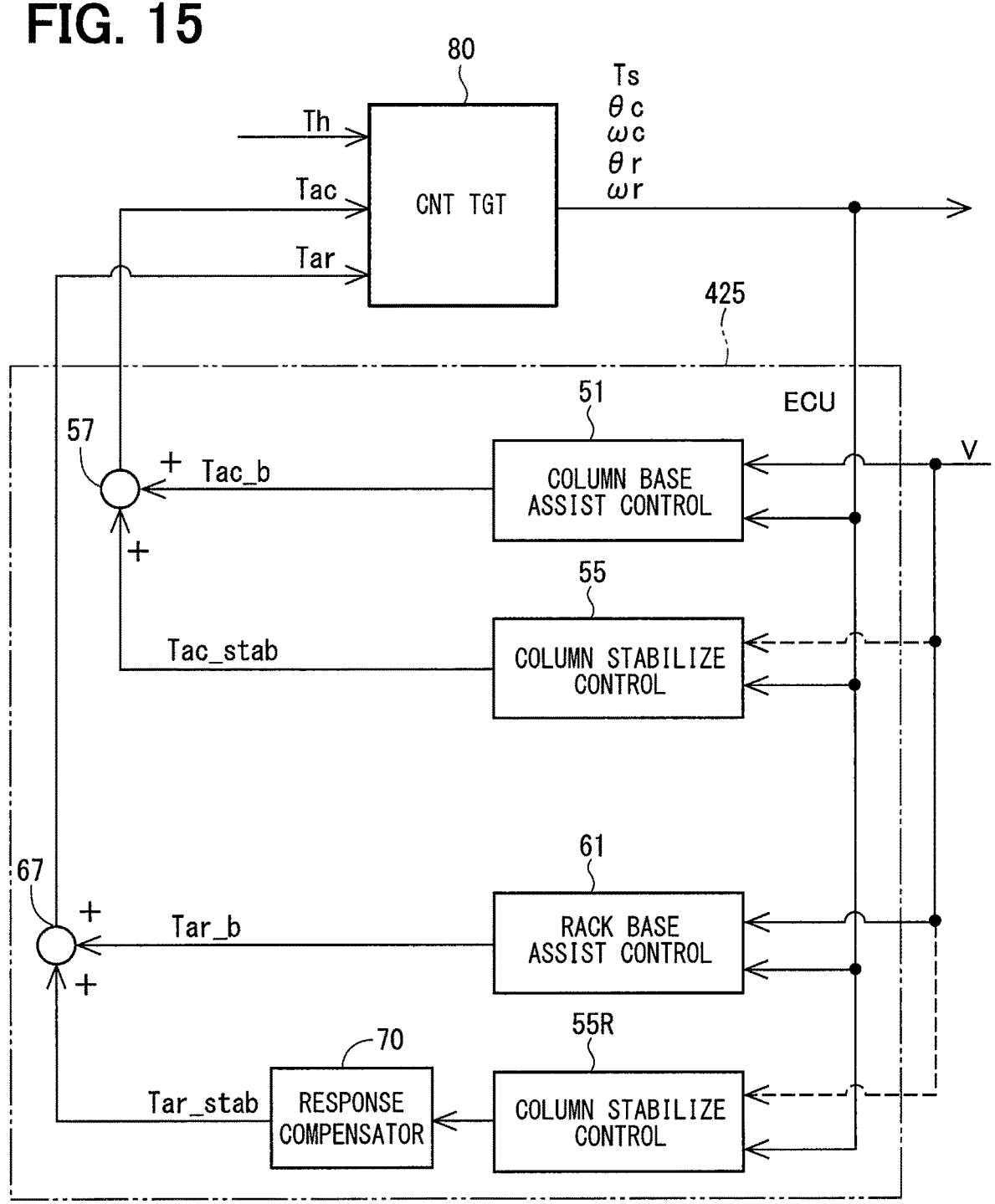
FIG. 15 is a control block diagram of the ECU of a modification example 5 of the second embodiment of the present disclosure.

The ECU 424 of the modification example 4 shown in FIG. 14 is different from the second modification of FIG. 12 in that the response compensator 70 is implemented on the output side of the column base assist controller 51R and is equivalent to the configuration of the second modification. The ECU 425 of the modification example 5 shown in FIG. 15 is equivalent to the configuration of the third modification in that the response compensator 70 is implemented on the output side of the column stabilization controller 55R as compared with the third modification of FIG. 13.

As described above, the ECUs 422 to 425 of the modification examples 2 to 5 make the control on the column side and the control on the rack side in common with each other regarding one of the base assist torque and the stabilization torque. That is, the ECUs 422 to 425 make one of the base assist control and the stabilization control of the column motor 81 and the rack motor 82 in common. Thereby, the design of one of the controllers 61 and 65 on the rack side becomes unnecessary.

Third Embodiment

Figure 16:
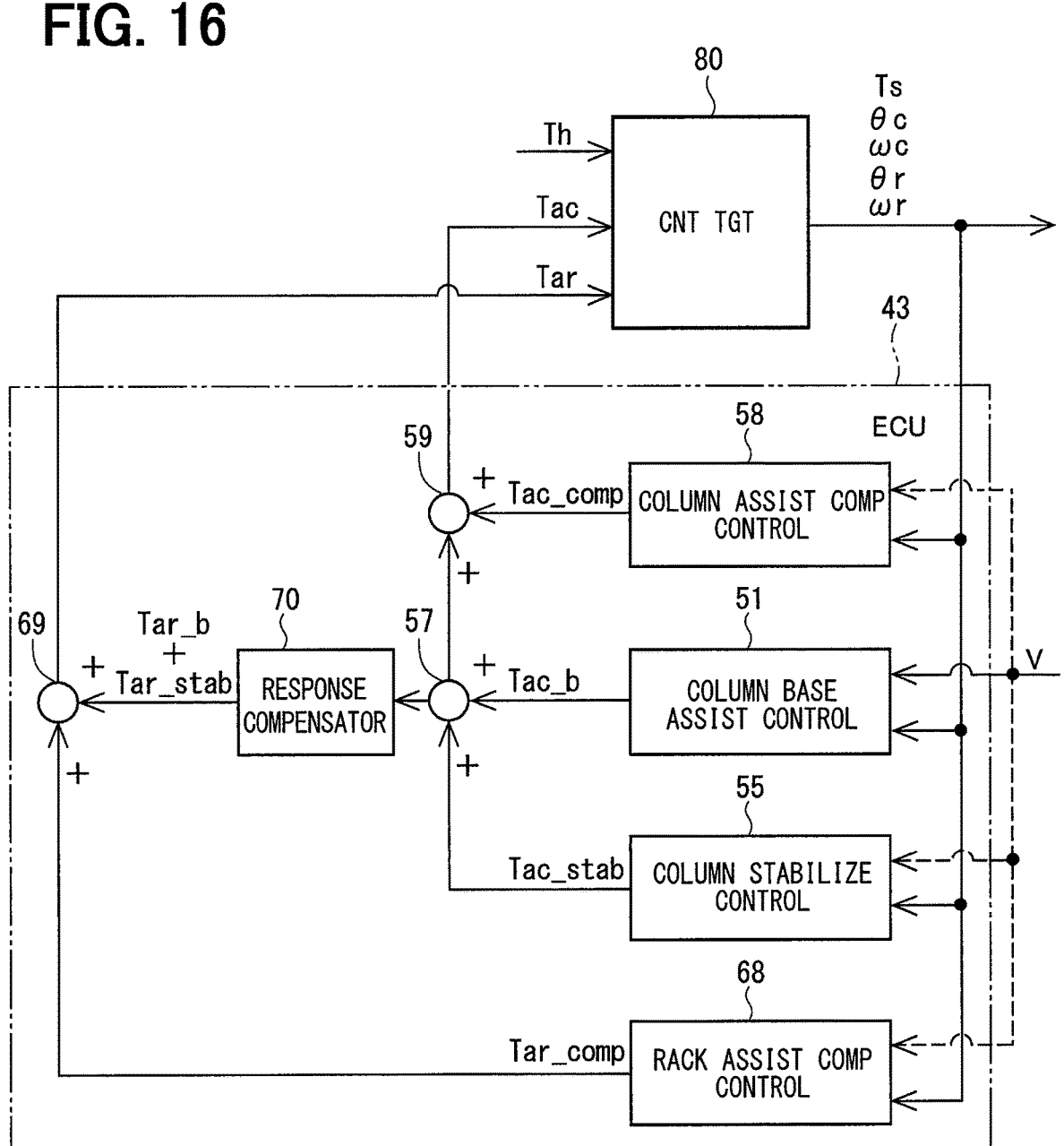
FIG. 16 is a control block diagram of the ECU according to a third embodiment of the present disclosure.

Next, the control configuration of the third embodiment is described with reference to FIG. 16. The ECU 43 of the third embodiment further includes an assist compensation controllers 58 and 68 for calculating assist compensation torques Tac_comp and Tar_comp, in comparison to the ECU 42 of the base configuration in the second embodiment shown in FIG. 6. Note that in describing the third embodiment, the ECU 43 may at least include the rack assist compensation controller 68, and the column assist compensation controller 58 may be omitted. In addition, the ECUs 421 to 425 of the modifications of the second embodiment shown in FIGS. 11 to 15 may further include the assist compensation controllers 58 and 68.

The assist compensation control includes control for improving one or more of the following events.
(1) Steering feel
(2) Vehicle behavior convergence or steering wheel behavior convergence
(3) Neutrality recovery character when the steering wheel returns to a neutral position (e.g., when the driver releases control of the steering wheel)
(4) Vehicle motion The column assist compensation controller 58 calculates a column assist compensation torque Tac_comp for improving the above-mentioned events based on the information of the torsion torque Ts, the column motor angle θc, and the column motor angular speed ωc. The rack assist compensation controller 68 calculates a rack assist compensation torque Tar_comp for improving the above events based on the information of the torsion torque Ts, the rack motor angle θr, and the rack motor angular speed ωr. Note that the information used for the calculation may only be part of the above, or information such as the vehicle speed V may be used as indicated by the broken line in FIG. 16.

The column assist compensation torque Tac_comp output from the column assist compensation controller 58 is further added by the adder 59 to the torque obtained by adding the base assist torque Tac_b and the stabilization torque Tac_stab. The rack assist compensation torque Tar_comp output from the rack assist compensation controller 68 is further added by the adder 69 to the output (Tar_b+Tar_stab) of the response compensator 70.

That is, the rack assist compensation torque Tar_comp is added to a value obtained by processing the sum of the column base assist torque Tac_b and the column stabilization torque Tac_stab by the response compensator 70 without passing through the response compensator 70. Therefore, in the third embodiment, the assist compensation control can be performed independently from the base assist control and the stabilization control.

Fourth Embodiment

Next, the control configuration of the fourth embodiment is described with reference to FIG. 17. In the configuration of the ECU of the above embodiment, the outputs of the stabilization controllers 55 and 65 are calculated regardless of the values of the assist gain of the base assist controllers 51 and 61. That is, the control is "stablization-prioritized" control that can stabilize the steering system even when the assist gain ("AsGain" in FIG. 17) in the base assist control is maximum. However, in general, it is difficult to achieve both stability and responsiveness without compromise, and, if stability is ensured, responsiveness is impaired. Therefore, in the fourth embodiment, a configuration is adopted in which the output of stabilization control is adjusted according to the value of the ratio against the maximum value of the assist gain.

Figure 17:
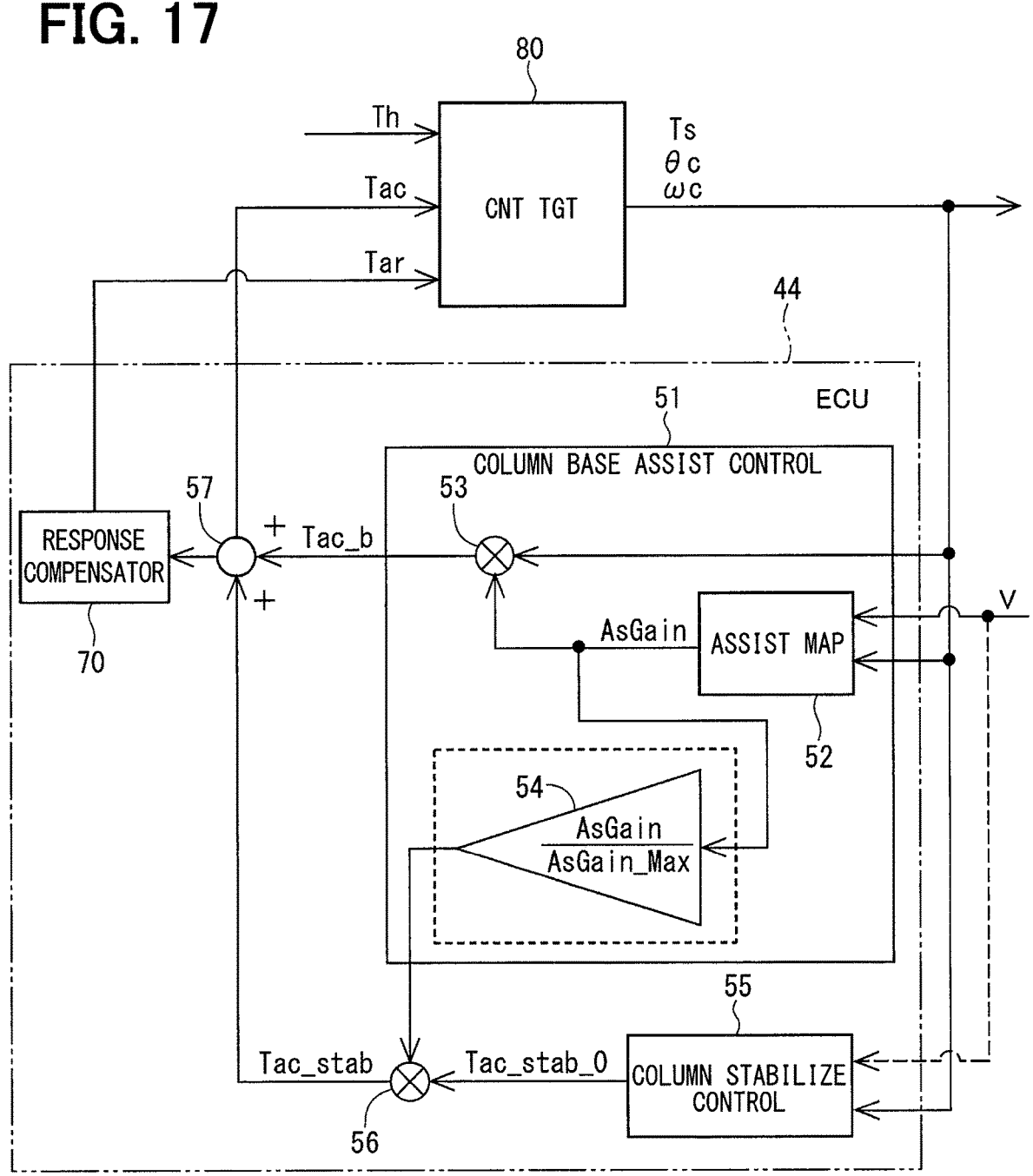
FIG. 17 is a control block diagram of the ECU according to a fourth embodiment of the present disclosure.

FIG. 17 shows only the base assist controller 51 and the stabilization controller 55 on the column side regarding the control configuration of the ECU 44, and the rack side is omitted therefrom. The column base assist controller 51 includes an assist map 52, a multiplier 53 and an adjuster 54. The assist map 52 calculates an assist gain AsGain based on information such as the torsion torque Ts, the column motor angle θc, the column motor angular speed ωc, the vehicle speed V and the like. The multiplier 53 multiplies the torsion torque Ts by the assist gain AsGain to output the base assist torque Tac_b. The adjuster 54 schedules (i.e., adjusts) an assist gain ratio (AsGain/AsGain_Max) which is a ratio of the assist gain to the maximum value as an adjustment coefficient. Here, AsGain_Max is the maximum value determined from the early stage of system design. The assist gain ratio is reflected in the ratio of the assist output to the maximum assist output.

The assist gain ratio (AsGain/AsGain_Max) scheduled by the adjuster 54 is multiplied to a stabilization torque Tac_stab_0 before adjustment calculated by the multiplier 56 provided on the output side of the column stabilization controller 55. That is, the output of the column stabilization controller 55 is adjusted by the assist gain ratio (AsGain/AsGain_Max), and the adjusted stabilization torque Tac_stab is added to the base assist torque Tac_b by the adder 57.

For example, when the maximum value AsGain_Max of the assist gain is set to 20 at the initial stage of design and the calculation result of the assist gain AsGain is 1, the assist gain ratio (AsGain/AsGain_Max) is (1/20). At this time, the ECU 44 sets the stabilization control output to (1/20) of the maximum output. When the calculation result of the assist gain AsGain is 20, the assist gain ratio (AsGain/AsGain_Max) is 1, and the ECU 44 sets the stabilization control output as the maximum output.

As described above, in the fourth embodiment, the greater the value of the assist gain AsGain of the column base assist controller 51 or 61 is, the greater the output of the stabilization controller 55 or 65 is adjusted. As a result, the responsiveness of the control is ensured in a range where the stability may be low (i.e., where the stability is allowed to be low), which leads to an improvement in the steering feel. Note that an adjustment coefficient scheduled by the adjuster 54 is not limited to the assist gain ratio (AsGain/AsGain_Max), but may also be a function or a map value that increases with the value of the assist gain. The values of functions and maps may be not continuous but may change stepwise (i.e., may have discrete values).

Fifth Embodiment

Figure 18:
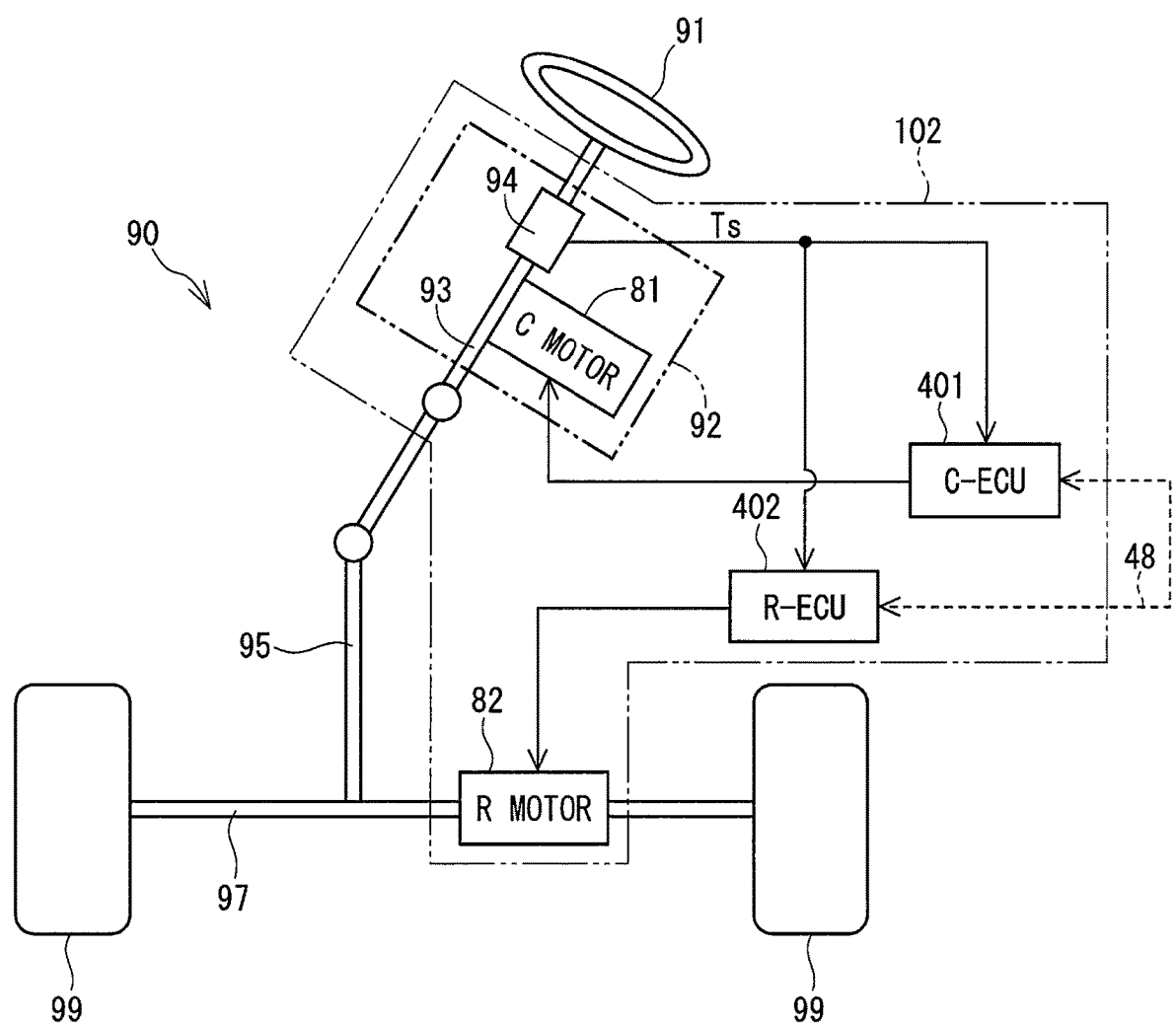
FIG. 18 is a diagram of a configuration of an electric power steering device according to a fifth embodiment of the present disclosure.

Next, with reference to FIG. 18, the ECU installation configuration according to the fifth embodiment is described. As shown in FIG. 18, the electric power steering device 102 according to the fifth embodiment includes a plurality of ECUs 401 and 402 as "one or more calculators." The plurality of ECUs 401 and 402 may be configured to sharingly bear functions, such as a column ECU 401 controlling the drive of the column motor 81 and a rack ECU 402 controlling the drive of the rack motor 82. In this case, the column ECU 401 and the column motor 81 may be integrated into a so-called "machine-control integral type" motor. The same applies to the rack ECU 402 and the rack motor 82.

In the fifth embodiment, since a plurality of ECUs 401 and 402 and a plurality of the motors 81 and 82 are provided redundantly, even if one of the ECUs breaks down, either the column motor 81 or the rack motor 82 is driven by the normal ECU. In such a case, although the total output of the two motors 81 and 82 decreases, simultaneous stopping of the two motors 81 and 82 can be avoided, and the assist function can be maintained.

Further, if a redundant configuration in which each of the ECUs 401 and 402 is respectively enabled to control both of the motors 81 and 82, two motors 81 and 82 are continuously drivable by the normal ECU even if one of the ECUs 401 and 402 fails.

Further, the plurality of ECUs 401 and 402 may be connected by a communication line 48 to communicate information with each other. The communication line 48 may be a dedicated line for communication between microcomputers, or may be a CAN bus or the like which is an in-vehicle communication network. For example, by mutually monitoring the failure state or the like of the other ECU, a normal ECU that has detected the failure of the other ECU can perform appropriate measures for handling the failure state.

Other Embodiments (A) To the contrary to the response compensator 70 of the second embodiment, "the difference between the gain and the phase of the column response characteristics with respect to the rack response characteristics in the preset frequency range" may be compensated by the response compensator 70 with respect to the rack side response characteristics. That is, contrary to the configuration of FIG. 10, a response compensator having the transmission characteristics of (G3/G2) may be implemented after (i.e., on an output side of) a rack assist map.

(B) The torque sensor is not limited to the position in the middle of the steering shaft 93 as shown in FIG. 1, but may also be provided in the middle of the intermediate shaft 95 to detect the torsion torque applied to the intermediate shaft 95. Also, multiple torque sensors may be provided redundantly at multiple positions.

(C) The column actuator and the rack actuator are not limited to a motor that generates the rotational output, but may also be a linear actuator that generates a linear output (e.g., translational motion).

(D) The "plurality of actuators" are not limited to two actuators, i.e., one column actuator and one rack actuator, and may also be three or more actuators provided redundantly. In that case, a response compensator may be provided for each of the reference actuators, and at least one of base assist torque control and stabilization torque control may be made in common with each other.

The steering control device is not limited to the embodiments described above and may be implemented with various modifications.

What is claimed is:

1. An electric power steering device for generating a steering assist torque by using a plurality of actuators in a steering system of a vehicle, in which a steering torque input to a steering wheel is transmitted to a tire via a steering shaft in a column, an intermediate shaft and a rack, the electric power steering device comprising:
 a column actuator disposed on a column side of the intermediate shaft and configured to output a column assist torque;
 a rack actuator disposed on a rack side of the intermediate shaft and configured to output a rack assist torque;
 one or more torque sensors respectively configured to detect a torsion torque applied to the steering shaft or to the intermediate shaft; and
 one or more calculators respectively configured to calculate an instruction value of the column assist torque or the rack assist torque based on the torsion torque detected by the one or more torque sensors, wherein
 the one or more calculators include:
  a base assist controller configured to calculate a base assist torque as a main component of the column assist torque and a main component of the rack assist torque, based on the torsion torque;
  a stabilization controller configured to calculate a stabilization torque for stabilizing a steering system as a sub-component of the column assist torque and a sub-component of the rack assist torque; and
  an adder configured to add the base assist torque and the stabilization torque,
 wherein the base assist controller separately calculates individual base assist torques for each of the column actuator and the rack actuator, or the base assist controller calculates a common base assist torque for both of the column actuator and the rack actuator, and
 wherein the stabilization controller separately calculates individual stabilization torques for each of the column actuator and the rack actuator, or the stabilization controller calculates a common stabilization torque for both of the column actuator and the rack actuator.

2. The electric power steering device of claim 1, further comprising:
 a response compensator, provided in theone or more calculators, configured to compensate a difference of a gain or a phase of rack response characteristics with respect to column response characteristics in a preset frequency range, the column response characteristics including response characteristics of the torsion torque in response to a change of the column assist torque and the rack response characteristics including response characteristics of the torsion torque in response to a change of the rack assist torque, wherein
 a post-process value of a component of the column assist torque, which is obtained by processing of the response compensator, is output as a value of a component of the rack assist torque, regarding at least one of the base assist torque and the stabilization torque.

3. The electric power steering device of claim 2, further comprising:
- a rack assist compensation controller, in at least one calculator, configured to calculate a rack assist compensation torque regarding the rack assist torque for an improvement of at least one of (a) a steering feel, (b) a vehicle behavior convergence or a steering wheel behavior convergence, (c) a steering wheel neutrality recovery character at a hands-off time, or (d) a vehicle motion, wherein
- the rack assist compensation torque is added, without undergoing processing of the response compensator, to a post-process value of the component of the column assist torque which is derived from processing by the response compensator.

4. The electric power steering device of claim 1, wherein
- the one or more calculators adjust the output of the stabilization controller according to an assist gain value of the base assist controller.

5. The electric power steering device of claim 1, wherein a plurality of the calculators are provided.

6. The electric power steering device of claim 5, wherein
- the plurality of the calculators are coupled by a communication line with each other for communication of information.

* * * * *